United States Patent [19]

Mount, II, Houston B. et al.

[11] Patent Number: 5,330,364

[45] Date of Patent: Jul. 19, 1994

[54] ELECTRICAL CONNECTOR FOR WELL SURVEYING TOOL

[75] Inventors: Mount, II, Houston B.; Jim R. Powers, both of Tulsa, Okla.

[73] Assignee: Amoco Corporation, Chicago, Ill.

[21] Appl. No.: 829,997

[22] Filed: Jan. 31, 1992

[51] Int. Cl.⁵ .................... H01R 17/18; G01V 1/00
[52] U.S. Cl. .................... 439/190; 340/855.1
[58] Field of Search .................. 439/190–194, 439/668, 669; 166/65.1, 66; 340/855.1, 853.4, 853.8, 854.1

[56] References Cited

U.S. PATENT DOCUMENTS

| | | | |
|---|---|---|---|
| 3,829,814 | 8/1974 | Straus | 439/101 |
| 4,401,947 | 8/1983 | Cox | 324/338 |
| 4,585,287 | 4/1986 | Ramsey et al. | 439/588 |
| 5,194,859 | 3/1993 | Warren | 340/853.4 |

*Primary Examiner*—Neil Abrams
*Attorney, Agent, or Firm*—James A. Gabala; Richard A. Kretchmer

[57] ABSTRACT

An electrical connector assembly 10 provides electrical connection between a surveying tool 53 positioned within a drillstring in a curved portion of a borehole and an electronics package 27 positioned in a vertical portion of the borehole. A non-conductive support 16 of the electrical connector assembly 10 is electrically connected to the surveying tool 53 and passes freely through a tool positioning pipe 18 and an adapter 14 for mounting the non-conductive support in the tool positioning pipe. A receptacle 24 for the non-conductive support 16 is electrically connected to the electronics package 27 for completing a plurality of electronic circuits between the surveying tool 53 and the electronics package when contacts 20 of the non-conductive support establish connection with contact elements 28 of the receptacle.

17 Claims, 6 Drawing Sheets

ELECTRICAL CONNECTOR FOR WELL SURVEYING TOOL

The present invention is directed to an electrical connector for providing electrical connection between an electronics package and a well surveying tool and, more particularly, for providing such electrical connection for a surveying tool for surveying within a drillstring.

A borehole is often drilled at an angle to a vertical borehole in a subterranean formation for increasing recovery of subterranean fluids such as oil and gas. Generally, the curved borehole is drilled in a particular azimuthal direction, e.g., east, and at a particular angle from vertical, e.g., 80°, for penetrating a hydrocarbon-bearing formation. In order to initiate such a borehole, a curved portion of the borehole is drilled by a technique referred to as directional drilling.

While directional drilling is in progress, surveying the curved portion of the borehole is necessary for determining if the curve is being directed to the desired azimuthal direction and angle. The time and expense of removing the drillstring from the borehole can be avoided by surveying within the drillstring. A necessary feature of a surveying tool for surveying within a drillstring is a flexible positioning means for positioning the surveying tool in the deviated portion of the borehole. Generally, a surveying tool requires electrical power to operate; and information gathered by the tool is transmitted electronically to the surface. Accordingly, adequate electrical circuits between the tool and an electronics package must be provided within the drillstring.

An apparatus and method for surveying within a drillstring is described in U.S. Pat. Nos. 5,210,533 and 5,194,859 for an "Apparatus and Method for Positioning a Tool in a Deviated Section of a Borehole," which are hereby incorporated by reference. One embodiment described therein comprises a wellbore examination tool, such as a surveying tool having an accelerometer probe, that is pushed through a hydraulic hose in flexible drillstring with a pipe for positioning the probe near the drill bit in the curved portion of the borehole. The positioning pipe must be of a small enough diameter to pass easily through the hydraulic hose and flexible enough to enable the pipe to bend without breaking in its tortuous path through the curved portion of the borehole. The accelerometers must be electrically connected to an electronics package positioned inside conventional drill collars.

A common problem with wellbore examination tools is electrical failure. One of the most frequent sites of electrical failure is at electrical connections between the tool and the electronics package. Electrical connectors for wellbore examination tools are addressed in several U.S. patents. For example, U.S. Pat. No. 4,585,287 (Ramsey, et al.) describes a cable connector, for use in wireline measurement while drilling operations, which has the advantages that cable tension is transferred to housings and that electrical connections are sealed from the environment. U.S. Pat. No. 3,829,814 (Straus) describes a logging cable connector which enables quick connection/disconnection of the logging cable at the borehole tool. U.S. Pat. No. 4,401,947 (Cox) describes a logging sonde of small enough diameter for passing through tubing in an open hole producing well for logging in the open hole without removing the tubing. This sonde utilizes a coaxial cable connector.

None of these patents disclose an electrical connector suitable for use with an apparatus for positioning a surveying tool inside a drillstring in a curved portion of a borehole. A need exists for an electrical connector assembly which provides sufficient circuits for establishing electrical connection between a wellbore examination tool and the electronics package of the tool described in U.S. Pat. Nos. 5,210,533 and 5,194,859 and which can pass freely through the flexible positioning means for positioning the surveying tool within the drillstring.

An object of the present invention is to provide a method and apparatus for establishing electrical connection between a surveying instrument, such as an accelerometer probe or an inclinometer, and an electronics package within a drillstring. Further objects shall appear hereinafter.

The objects of the present invention can be attained by an electrical connector assembly comprising a non-conductive support having a plurality of contacts suitable for establishing electrical connection with a wellbore examination tool through a tool positioning pipe; an adapter for mounting the non-conductive support in the tool positioning pipe, the adapter having an inlet for receiving the non-conductive support, an outlet for allowing the plurality of contacts to extend outwardly therefrom, and a means for holding the non-conductive support; and a receptacle for receiving the non-conductive support, the receptacle having a plurality of contact elements suitable for establishing electrical connection with the plurality of contacts and for establishing electrical connection with an electronics package.

Figure 1:
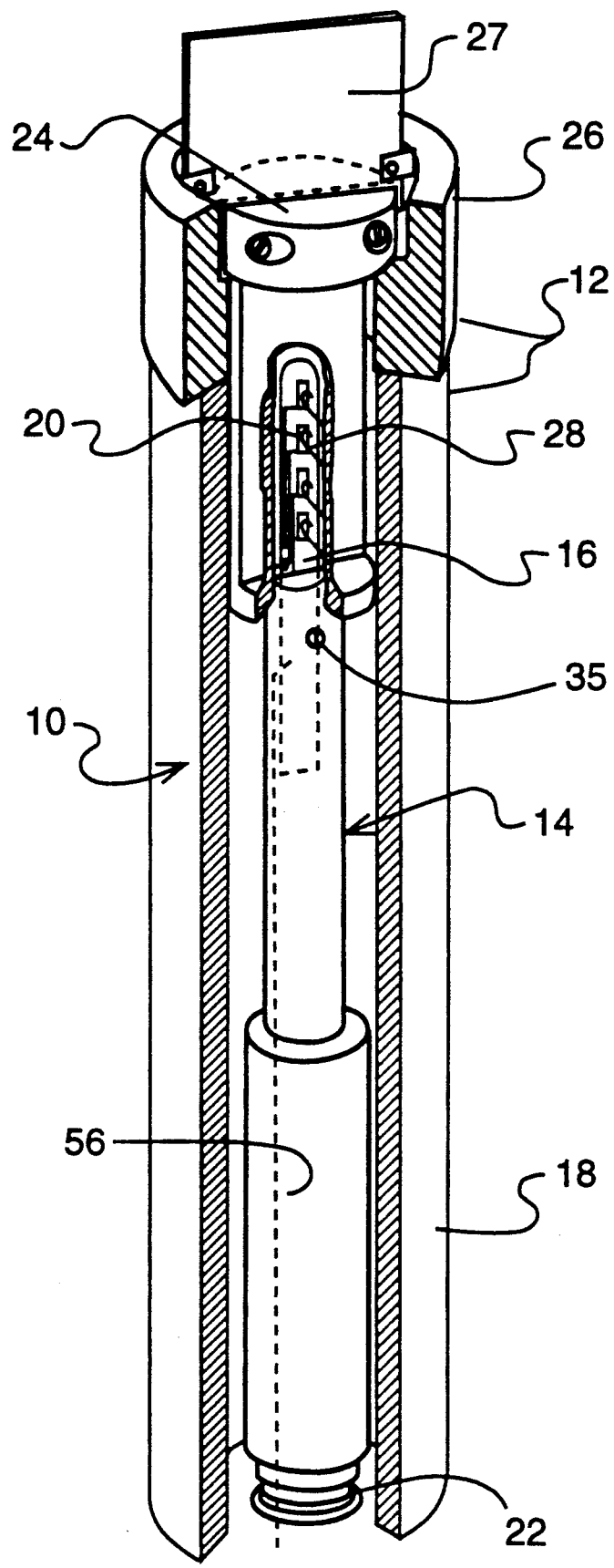
FIG. 1 is a cut-away drawing of the electrical connector assembly of the present invention within a pipe combination for positioning a wellbore examination tool.

Referring to FIG. 1, the electrical connector assembly 10 of the present invention is utilized inside a pipe combination 12. The adapter 14 of the electrical connector assembly 10 is utilized primarily for mounting the non-conductive support 16 in a flexible first pipe 18 of the pipe combination 12. Leads (not shown) extend from a plurality of contacts 20 on the non-conductive support 16 to a wellbore examination tool (not shown) at an opposite end of the first pipe 18 as the non-conductive support 16. In one embodiment, the leads are inside of the first pipe 18. The adapter 14 has a substantially cylindrical base 22 of reduced diameter around which an O-ring 15 (shown on FIG. 2) is fitted for securing the adapter 14, holding the non-conductive support 16, inside of the first pipe 18. The pipe 18, generally has a shoulder 19 (shown on FIG. 2) for positioning or holding the adapter 14 therein. The receptacle 24 of the electrical connector assembly 10 of the present invention is held inside of a second pipe 26 of the pipe combination 12. Leads (not shown) extend from a plurality of contact elements 28 on the receptacle 24 to an electronics package, such as electronic circuit board 27 connected to electrical components at the surface. The first pipe 18 is connected to the second pipe 26 and the non-conductive support 16 extends into the receptacle 24 in such a manner that the plurality of contact elements 28 establish connection with the plurality of contacts 20 for completing a plurality of electrical circuits between the electronics package and the wellbore examination tool.

Figure 2:
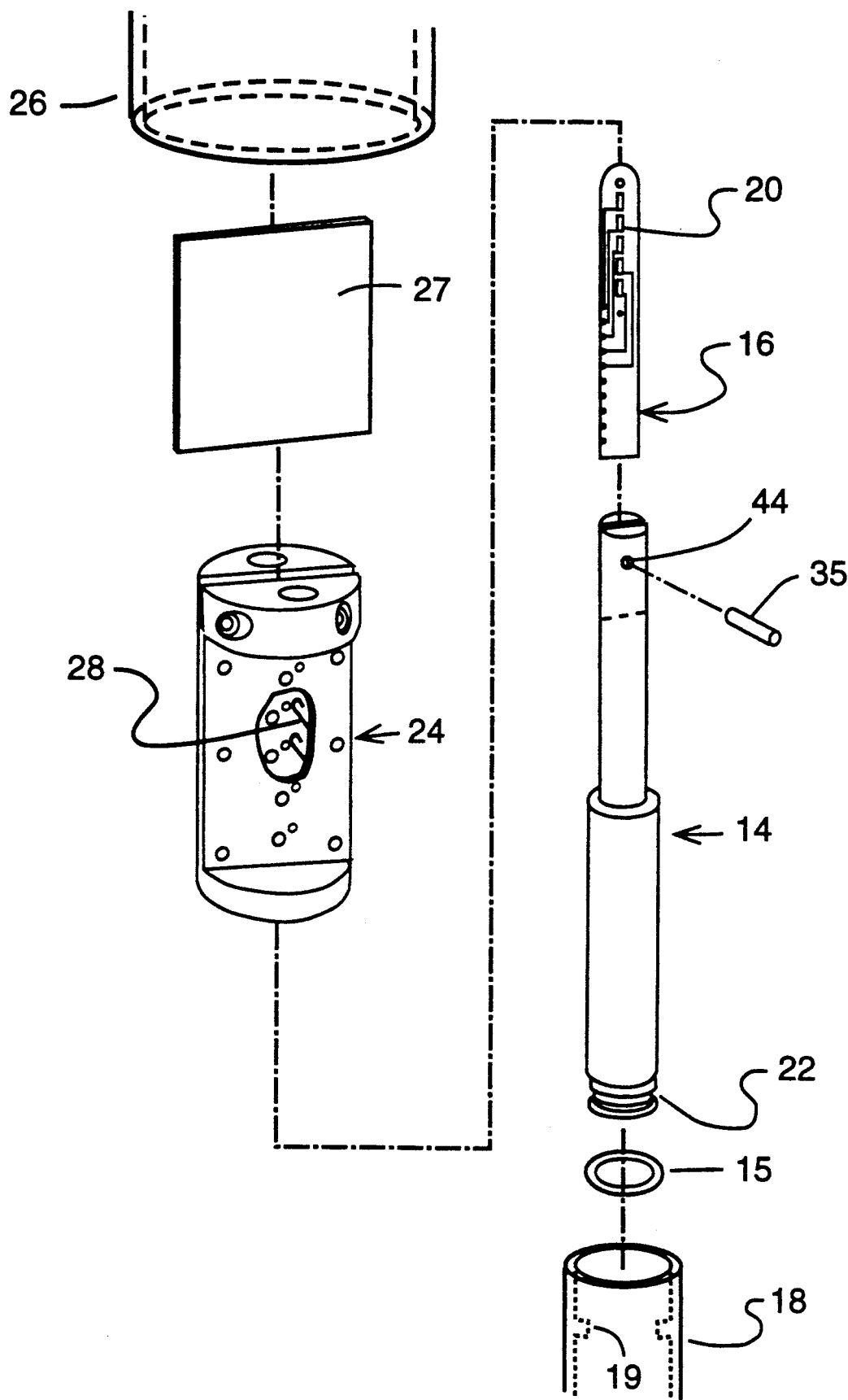
FIG. 2 is an exploded view of the electrical connector assembly of FIG. 1.

The relation of the various parts of the electrical connector assembly 10 can be seen by referring to FIG. 2, an exploded view of the electrical connector assembly 10 and pipe combination 12.

Figure 3:
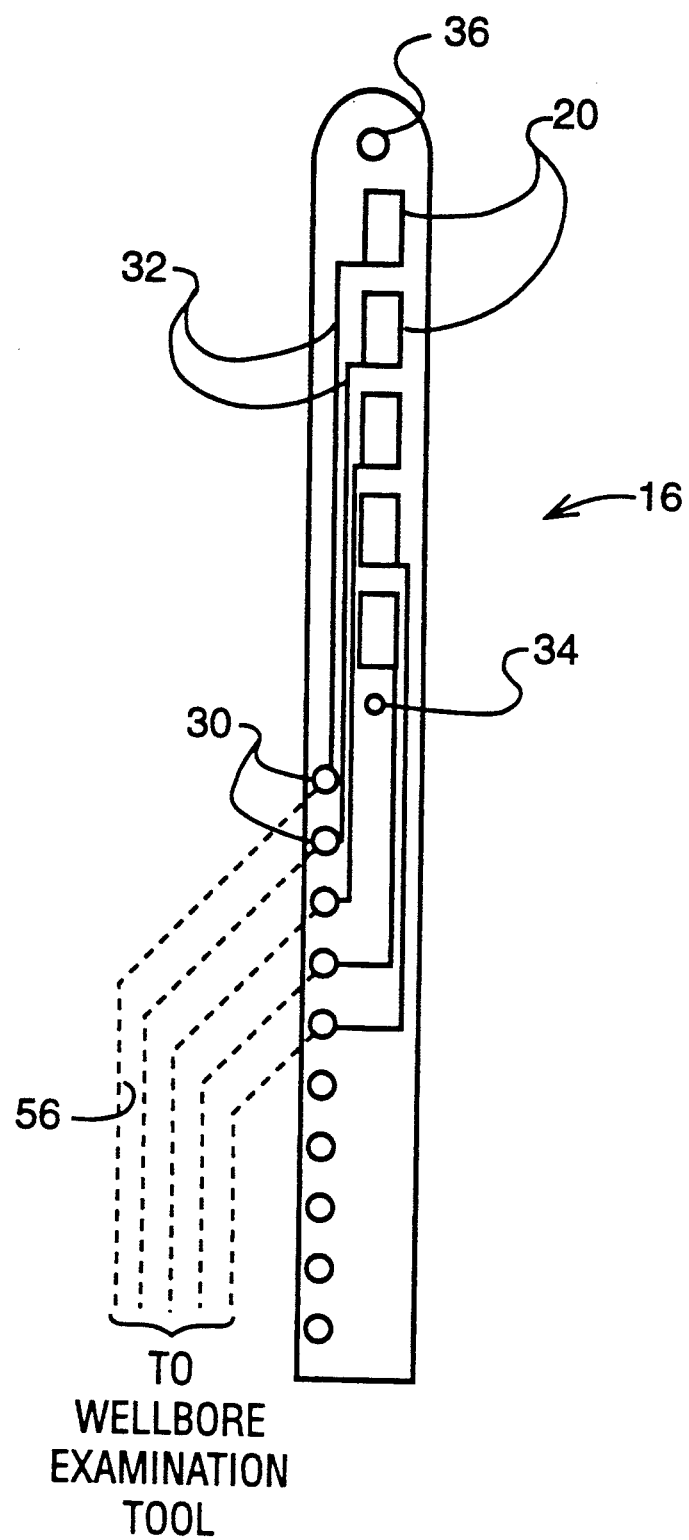
FIG. 3 is a plane view of a side of the non-conductive support of the electrical connector assembly of the present invention.

In somewhat greater detail, referring to FIG. 3, the non-conductive support 16 of the present invention has at a first end a plurality of contacts 20 suitable for establishing electrical connection with a wellbore examination tool. In one embodiment the plurality of contacts 20 are electrically connected to a corresponding plurality of terminals 30 at a second end by a plurality of leads 32. In one embodiment leads from a wellbore examination tool (not shown) are connected at the plurality of terminals 30. The non-conductive support 16 has a means 34 for being secured inside the adapter of the present invention. In one embodiment the non-conductive support 16 has an opening therethrough 34 for insertion therethrough of a pin 35 (see FIG. 2) for holding the non-conductive support 16 inside the adapter 14 of the present invention. In one embodiment the non-conductive support 16 also has an opening therethrough 36 for insertion therethrough of a wire or string for pulling the non-conductive support 16 through a pipe.

In even greater detail, still referring to FIG. 3, the non-conductive support 16 in one embodiment is a printed circuit board. In one embodiment, the plurality of contacts 20 are comprised of a conductive metal such as copper with a gold plating and the plurality of terminals 30 are solder joints for attaching leads from a wellbore examination tool thereto. The leads can be attached thereto by non-conductive glue. In one embodiment, the non-conductive support 16 has ten contacts 20, five on each side, and ten corresponding terminals 30.

Figure 4:
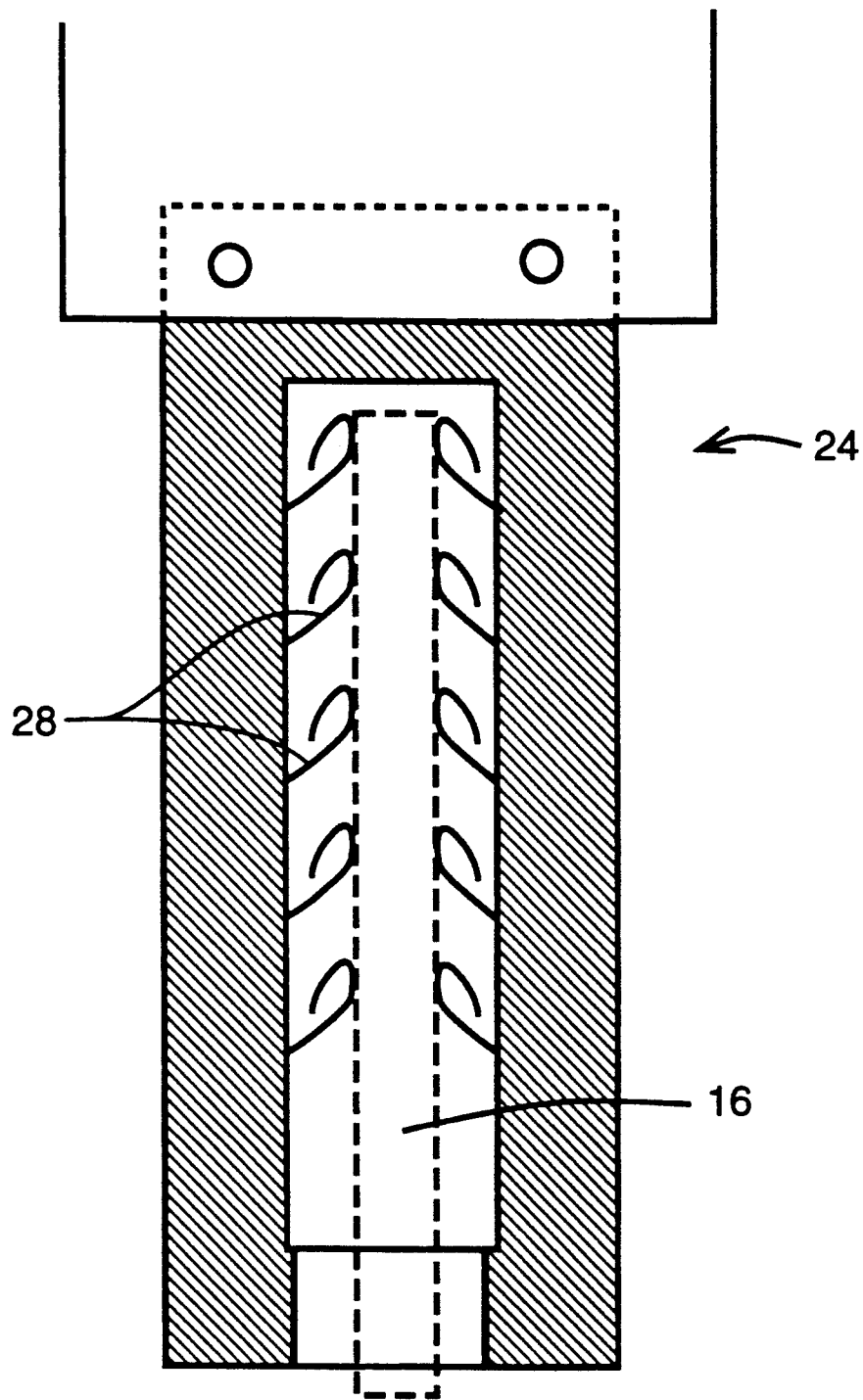
FIG. 4 is a sketch of the internal portion of the receptacle of the electrical connector assembly of the present invention.

Referring to FIG. 4, the receptacle 24 of the present invention has a plurality of contact elements 28 for establishing electrical connection with the contacts of the non-conductive support of the present invention. The plurality of contact elements 28 are in electrical connection with an electronics package (not shown). (Note that an envisioned embodiment of this invention comprises the contact elements of the receptacle being in electrical connection with an electronic device and the contacts of the non-conductive support being in electrical connection with an electronics package or electricity source). In one embodiment, the plurality of contact elements 28 are contact springs 28. The contact springs 28 in a specific embodiment are comprised of a conductive metal and are gold-plated. In one embodiment, the receptacle 24 has ten contact elements 28, five on each interior wall.

Figure 5:
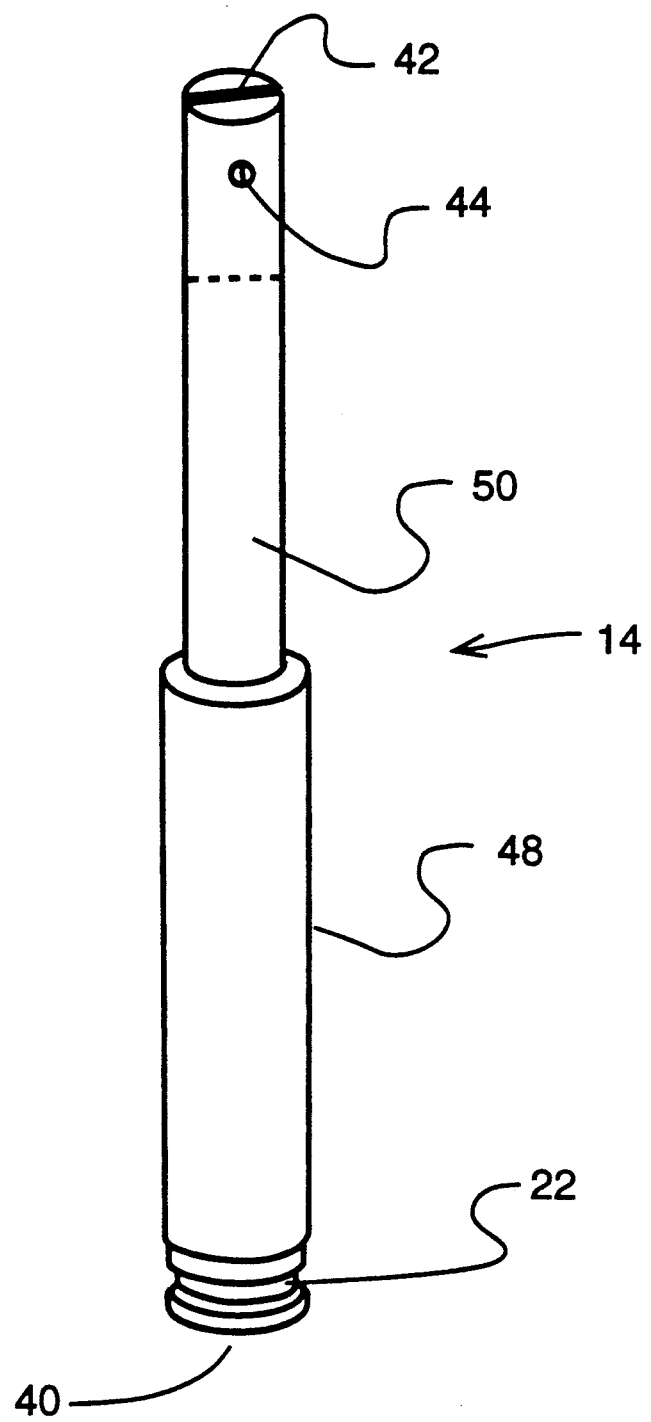
FIG. 5 is a sketch of the adapter of the electrical connector assembly of the present invention.

Referring to FIG. 5, the adapter 14 has an inlet 40 for receiving the first end of the non-conductive support and an outlet 42 for allowing the first end of the non-conductive support 16, having the plurality of contact elements, to extend outwardly therefrom. The adapter 14 has a means 44 for allowing the non-conductive support 16 to be held therein. The means 44 can be an opening 44 for insertion of a pin therethrough and through a corresponding opening 34 in the non-conductive support 16. In one embodiment the adapter 14 has a base 22 at the inlet 40 for mounting the adapter 14 at the end of the flexible tool-positioning pipe 18. In a specific embodiment the base 22 is substantially cylindrical and is connected to a first end of a substantially cylindrical first portion 48 having a larger diameter than that part of the base 22 to which the O-ring 15 is fitted. Further, a second end of the substantially cylindrical first portion 48 is connected to a substantially cylindrical second portion 50.

Figure 6:
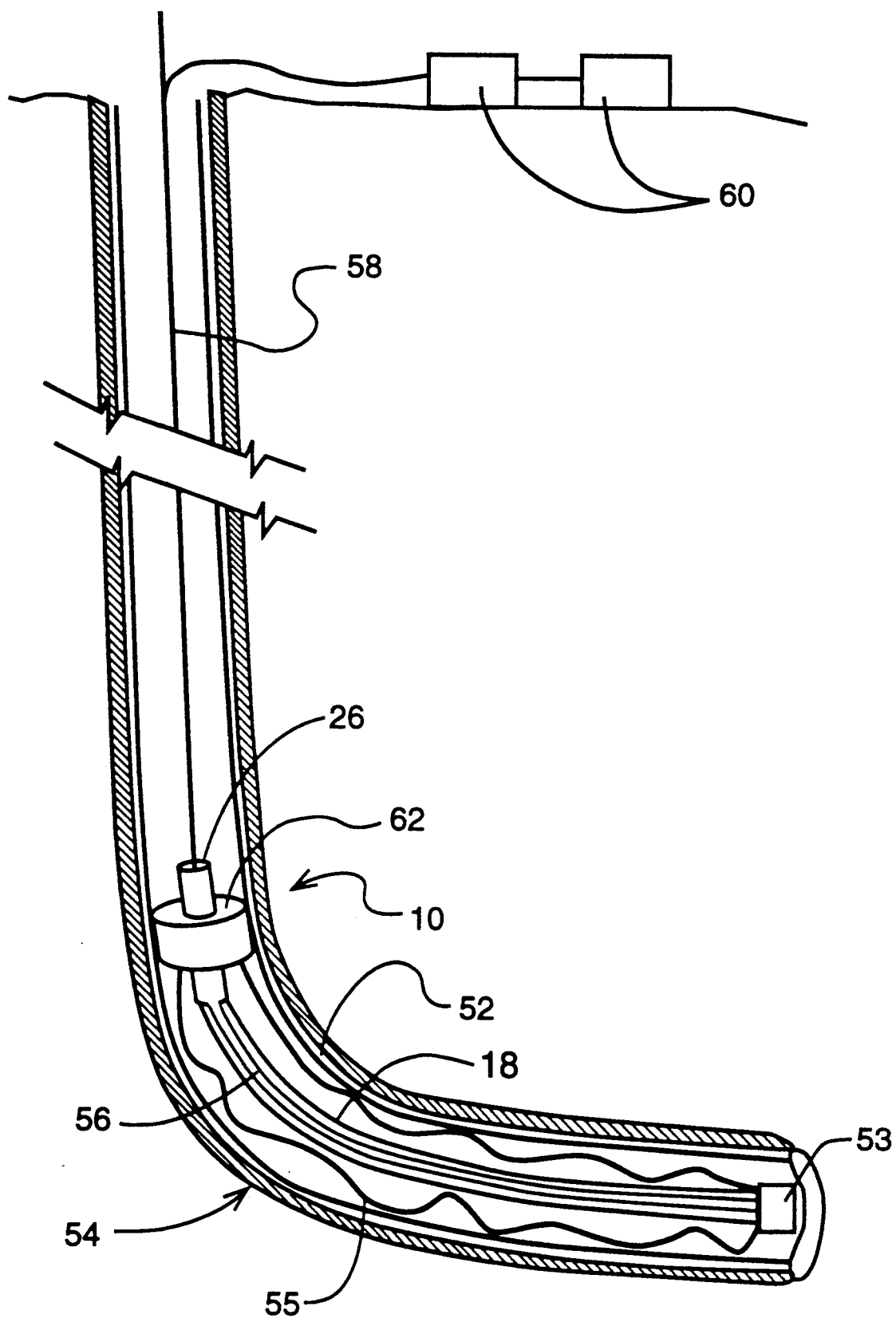
FIG. 6 is a cut-away drawing of a wellbore examination tool positioned within a drillstring in a curved portion of a borehole, which tool utilizes the electrical connector assembly of the present invention.

FIG. 6, a cut-away view of a wellbore examination tool 53 positioned within flexible drillstring 52 and near a drillbit (not shown) in a curved portion of a borehole 54, illustrates the environment in which the electrical connector assembly 10 of the present invention is utilized. The following method is employed for established electrical connection between the wellbore examination tool 53 and an electronics package 27.

Electrical connection is established between the wellbore examination tool 53 and a plurality of terminals 30 on a first end of a non-conductive support 16 of an electrical connector assembly 10. The non-conductive support 16 is passed through a tool positioning pipe 18 and then through an adapter of the electrical connector assembly 10. A second end of the non-conductive support 16 is secured in the adapter 14 such that the first end of the non-conductive support extends outwardly therefrom. The adapter 14 is mounted in the tool positioning pipe 18 such that the first end of the non-conductive support 16 extends toward the outlet of the pipe, i.e., away from the wellbore examination tool. The first end of the non-conductive support 16 is inserted into a receptacle 24 of the electrical connector assembly 10 such that the plurality of contacts 20 of the non-conductive support establish connection with a plurality of contact elements 28 of the receptacle for completing a plurality of electrical circuits between the wellbore examination tool 53 and an electronics package.

In an embodiment of the present invention for use with an apparatus for positioning a surveying tool 53 inside a drillstring 52 in a curved portion of a short radius curved borehole 54, the non-conductive support 16 is sized for passing through the flexible tool-positioning pipe 18, which in turn is sized for passing through hydraulic hose 55 inside flexible drillstring 52. In one embodiment, the non-conductive support is an about 0.25 inch (0.64 cm.) wide, about 0.06 inch (0.15 cm.) deep and about 6 inches (15.2 cm.) long electronic circuit board for fitting through a flexible steel pipe 18 which is about 0.265 inch (0.673 cm.) I.D. and about 0.5 inch (1.3 cm.) O.D. The non-conductive support 16 has ten gold plated copper contacts at a first end, five on each side of the non-conductive support. The gold plated copper contacts are electrically connected via leads 32 to ten corresponding terminals 30 at a second end of the non-conductive support 16. Leads 56 from accelerometers of the surveying tool 53 are glued to the terminals 30 of the non-conductive support 16 for establishing electrical connection between the accelerometers and the ten contacts 20. The advantage of using glue is that glue takes up a small amount of space compared to other means for attachment. The matter in which one embodiment of the electrical connector assembly 10 is assembled will now be described.

As three twenty foot (6.1 m.) sections of flexible tool-positioning pipe 18 are fitted together, a guide wire 58 is pulled through the sections. The total length of flexible tool-positioning pipe 18 is not limited by this invention. The total length needs to be sufficient for positioning the tool 53 near the drillbit. In other embodiments, fifty-four foot (16.5 m.) and sixty-four foot (19.5 m.) total length pipes are assembled. Once the flexible tool-positioning pipe 18 is assembled, an end of the guide wire 58 at a first end of the pipe is affixed to the non-conductive support 16 and the other end of the wire at the second end of the flexible pipe is pulled for pulling the non-conductive support through the flexible pipe.

The non-conductive support 16 is secured inside of the adapter by a pin fitted through respective openings 34 and 44 therein. The adapter 14 is mounted in a second end of the flexible pipe 18, positioned against a shoulder 14 therein. An O-ring 15 around the base of the adapter 14 provides a friction fit. As the non-conductive support 16 is secured into the adapter 14, leads are folded and fit into hollow space in flexible pipe 18.

The receptacle 24 is electrically connected to an electronics package. In one embodiment, the electronics package consists of an electronic circuit board 27, such as one including a signal conditioning/multiplexing process system for accelerometer signals, which is electrically connected to the receptacle. The electronic circuit board 27 is also electrically connected via wireline 58 to electronics 60 at the surface, e.g., a power source and computers. A grounding device, such as a spring-loaded brass plate for contacting wellbore casing, can be provided along with the electronic circuit board.

The receptacle/electronic circuit board assembly is housed in a pipe 26 designed to attach to the flexible pipe 18 which houses the adapter 14 for the non-conductive support 16. The non-conductive support 16 and receptacle 24 are marked for indicating the proper mating orientation. The non-conductive support 16 and receptacle 24 can be etched for ensuring that they can only be mated in the proper orientation.

The non-conductive support 16 and the receptacle 24 are mated and then the second flexible pipe 26 that houses the receptacle is attached to the first flexible pipe 18 that houses the non-conductive support. A positioning device, such as a mule shoe stinger (not shown), is adjustably attached along the length of the flexible pipe at a location for ensuring that the desired length of flexible pipe will extend into the curved portion of the drillstring for positioning the surveying tool near the drillbit. The entire surveying assembly is lowered into the drillstring on a wireline 58 until the mule shoe stinger fits into a guide in the mule shoe 62.

An advantage of the electrical connector assembly of this invention is that it can be constructed quickly and inexpensively for use in an oilfield.

Although the present invention is described in relation to a specific embodiment, the electrical connector assembly disclosed herein is not limited to the uses described herein. Further modifications, apart from those shown or suggested herein, can be made within the scope and spirit of the present invention.

What is claimed is:

1. An electrical connector assembly comprising:

a non-conductive support having a plurality of contacts suitable for establishing electrical connection with a wellbore examination tool through a tool positioning pipe;

an adapter for mounting the non-conductive support in the tool positioning pipe, the adapter having an inlet for receiving the non-conductive support, an outlet for allowing the plurality of contacts to extend outwardly therefrom, and a means for holding the non-conductive support; and a receptacle for receiving the non-conductive support, the receptacle having a plurality of contact elements suitable for establishing electrical connection with the plurality of contacts and for establishing electrical connection with an electronics package.

2. An electrical connector assembly of claim 1 in which the plurality of contacts are at a first end of the non-conductive support and are electrically connected to a corresponding plurality of terminals at a second end of the non-conductive support.

3. An electrical connector assembly of claim 2 in which the plurality of contacts are electrically connected to the corresponding plurality of terminals by leads.

4. An electrical connector assembly of claim 3 in which the non-conductive support is a printed circuit board.

5. An electrical connector assembly of claim 1 in which the adapter comprises a base at the inlet for mounting the adapter in the tool positioning pipe.

6. An electrical connector assembly of claim 5 in which the non-conductive support is held in the adapter by a pin inserted through corresponding apertures in the adapter and non-conductive support.

7. An electrical connector assembly of claim 6, in which the adapter comprises a substantially cylindrical first portion 48 having two ends, and a base 22 at one end of said first portion that is adapted to hold an O-ring.

8. An electrical connector assembly of claim 7, in which the adapter comprises a substantially cylindrical second portion 50 connected to the other end of said first portion.

9. An electrical connector assembly of claim 1, in which the plurality of contacts are comprised of conductive metal.

10. An electrical connector assembly of claim 9 in which the plurality of contacts are comprised of copper.

11. An electrical connector assembly of claim 10 in which the plurality of contacts are gold-plated.

12. An electrical connector assembly of claim 1 in which the plurality of contact elements comprise a plurality of contact springs.

13. An electrical connector assembly of claim 12 in which the plurality of contact springs are comprised of conductive metal.

14. An electrical connector assembly of claim 13 in which the plurality of contact springs are gold plated.

15. An electrical connector assembly of claim 1, in which the tool positioning pipe is sized for passing through hydraulic hose inside flexible drillstring.

16. An electrical connector assembly of claim 1, in which the non-conductive support is sized for passing through the tool positioning pipe.

17. A method comprising:

establishing electrical connection between a wellbore examination tool and a plurality of contacts on a first end of a non-conductive support;

passing the non-conductive support through a tool positioning pipe;

passing the non-conductive support through an adapter and securing a second end of the non-conductive support therein such that the first end of the non-conductive support extends outwardly therefrom;

mounting the adapter in the tool positioning pipe such that the first end of the non-conductive support extends toward the outlet of the pipe; and inserting the first end of the non-conductive support into a receptacle such that the plurality of contacts of the non-conductive support establish connection with a plurality of contact elements of the receptacle for completing a plurality of electrical circuits between the wellbore examination tool and an electronics package.

* * * * *